US012738497B2

(12) United States Patent
Kim et al.

(10) Patent No.: US 12,738,497 B2
(45) Date of Patent: Sep. 15, 2026

(54) NEGATIVE ELECTRODE ACTIVE MATERIAL FOR LITHIUM SECONDARY BATTERY, METHOD FOR MANUFACTURING THE SAME, AND LITHIUM SECONDARY BATTERY COMPRISING THE SAME

(71) Applicant: SK On Co., Ltd., Seoul (KR)

(72) Inventors: Joon Sup Kim, Daejeon (KR); Jee Hee Lee, Daejeon (KR); Nam Hyeong Kim, Ulsan (KR); Jae Kyung Sung, Ulsan (KR); Tae Yong Lee, Ulsan (KR); Jae Phil Cho, Ulsan (KR)

(73) Assignees: SK On Co., Ltd., Seoul (KR); UNIST (ULSAN NATIONAL INSTITUTE OF SCIENCE AND TECHNOLOGY), Ulsan (KR)

(*) Notice: Subject to any disclaimer, the term of this patent is extended or adjusted under 35 U.S.C. 154(b) by 0 days.

(21) Appl. No.: 18/485,325

(22) Filed: Oct. 12, 2023

(65) Prior Publication Data

US 2024/0047678 A1 Feb. 8, 2024

Related U.S. Application Data

(62) Division of application No. 16/793,799, filed on Feb. 18, 2020, now Pat. No. 11,824,195.

(30) Foreign Application Priority Data

Feb. 18, 2019 (KR) ........................ 10-2019-0018652
Feb. 17, 2020 (KR) ........................ 10-2020-0019195

(51) Int. Cl.
*H01M 4/587* (2010.01)
*H01M 4/36* (2006.01)
(Continued)

(52) U.S. Cl.
CPC ........... *H01M 4/587* (2013.01); *H01M 4/364* (2013.01); *H01M 4/366* (2013.01); *H01M 4/386* (2013.01);
(Continued)

(58) Field of Classification Search
None
See application file for complete search history.

(56) References Cited

U.S. PATENT DOCUMENTS 5,624,606 A * 4/1997 Wilson .................. H01M 4/587 252/519.1
2012/0264020 A1 10/2012 Burton et al.
(Continued)

FOREIGN PATENT DOCUMENTS

JP 3466576 B2 11/2003
KR 20140022679 A 2/2014
(Continued)

OTHER PUBLICATIONS

Office Action for Korean Patent Application No. 10-2020-0019195 issued by the Korean Patent Office on Nov. 5, 2024.

*Primary Examiner* — Zhongqing Wei
(74) *Attorney, Agent, or Firm* — IP & T GROUP LLP

(57) ABSTRACT

Provided is a negative electrode active material for a lithium secondary battery according to the present invention, including a carbon-based particle including pores in an inner portion and/or a surface thereof; and a silicon-based coating layer positioned on a pore surface and/or a pore-free surface of the carbon-based particle and containing silicon carbon compound.

6 Claims, 5 Drawing Sheets

(51) Int. Cl.

| | |
|---|---|
| ***H01M 4/38*** | (2006.01) |
| ***H01M 4/58*** | (2010.01) |
| ***H01M 10/052*** | (2010.01) |
| *H01M 4/02* | (2006.01) |

(52) U.S. Cl.

CPC ........... *H01M 4/58* (2013.01); *H01M 10/052* (2013.01); *H01M 2004/021* (2013.01); *H01M 2004/027* (2013.01)

(56) References Cited

U.S. PATENT DOCUMENTS

| | | | | |
|---|---|---|---|---|
| 2019/0016601 | A1* | 1/2019 | Lyubina ................ | H01M 4/587 |
| 2019/0036121 | A1* | 1/2019 | Cho .................... | H01M 4/1395 |
| 2021/0210751 | A1* | 7/2021 | Park .................... | H01M 50/417 |

FOREIGN PATENT DOCUMENTS

| | | | | |
|---|---|---|---|---|
| KR | 20180036456 A | 4/2018 | | |
| KR | 10-2018-0113187 A | 10/2018 | | |
| WO | WO-2020138629 A1 * | 7/2020 | ............ | H01M 4/625 |

* cited by examiner

NEGATIVE ELECTRODE ACTIVE MATERIAL FOR LITHIUM SECONDARY BATTERY, METHOD FOR MANUFACTURING THE SAME, AND LITHIUM SECONDARY BATTERY COMPRISING THE SAME

CROSS-REFERENCE TO RELATED APPLICATIONS

This application is a division of U.S. patent application Ser. No. 16/793,799 filed on Feb. 18, 2020, which claims priority under 35 U.S.C. § 119 to Korean Patent Application Nos. 10-2019-0018652, filed on Feb. 18, 2019 and 10-2020-0019195 filed on Feb. 17, 2020 in the Korean Intellectual Property Office, the disclosure of which is incorporated herein by reference in its entirety.

TECHNICAL FIELD

The following disclosure relates to a lithium secondary battery, and more particularly, to a negative electrode active material for a lithium secondary battery, a method for preparing the same, and a lithium secondary battery containing the same.

BACKGROUND

Recently, as a demand for electronic devices such as mobile devices, and the like, has increased, the development of a technology for the mobile devices has expanded. A demand for a lithium secondary battery such as a lithium battery, a lithium ion battery, and a lithium ion polymer battery as a driving power source of these electronic devices has been significantly increased. In addition, in accordance with the trend toward tightening of regulations related to fuel economy and exhaust gas of an automobile, a market for electric vehicles has been rapidly grown. Therefore, it has been expected that a demand for mid-sized to large-sized secondary batteries such as secondary batteries for electric vehicles (EVs) and secondary batteries for energy storage systems (ESSs) will rapidly increase.

Meanwhile, as a negative electrode material of the secondary battery, a carbon-based negative electrode material having excellent cycle characteristics and a theoretical capacity of 372 mAh/g has been generally used. However, as the secondary batteries have been gradually required to have a high-capacity as in the mid-sized to large-sized secondary batteries, inorganic negative electrode materials such as silicon (Si), germanium (Ge), tin (Sn), or antimony (Sb) having a capacity of 500 mAh/g or more that are capable of replacing the theoretical capacity of the carbon-based negative electrode material have become prominent.

Among these inorganic negative electrode materials, a silicon-based negative electrode material has a significantly large lithium binding amount. However, the silicon-based negative electrode material causes a significant volume change at the time of intercalation/deintercalation of lithium, that is, at the time of charging and discharging of a battery, and pulverization may thus be generated. As a result, pulverized particles are aggregated, such that a negative electrode active material may be electrically deintercalated from a current collector, which may cause loss of a reversible capacity during a long cycle. For this reason, the silicon-based negative electrode material and a secondary battery containing the silicon-based negative electrode material have disadvantages such as low cycle life characteristics and a low capacity retention rate in spite of advantages due to a high charge capacity, such that it is difficult to commercialize the silicon-based negative electrode material and the secondary battery containing the silicon-based negative electrode material.

In order to solve the problems of the silicon-based negative electrode material as described above, as in U.S. Pat. No. 9,911,976, a study on a silicon-based composite negative electrode material such as a composite of carbon and silicon has been actively conducted. However, even in such a composite negative electrode material, the more the amount of silicon, the more severe the volume expansion occurring at the time of charging and discharging of the secondary battery. Therefore, as a new surface of silicon in the composite negative electrode material is continuously exposed to an electrolyte to continuously form a solid electrolyte interface (SEI) layer and thus form a thick side reaction layer, resulting in depletion of the electrolyte and an increase in a battery resistance. In addition, such a thick side reaction layer affects graphite as well as silicon and generates an electric peel-off phenomenon between negative electrode active material particles or from a current collector to rapidly deteriorate performance of the secondary battery, such as cycle life characteristics.

Further, when silicon is exposed to the air at the time of pulverizing the negative electrode active material or manufacturing the negative electrode, the silicon reacts with oxygen, such that an oxide film is formed on a surface of the silicon. Therefore, the capacity of the negative electrode active material may be decreased by the formation of the oxide film, and the electrolyte may be depleted due to repetition of a process in which the oxide film reacts with the electrolyte and is melted at the time of driving the battery and the oxide film is again formed on the surface.

Accordingly, in order to commercialize a high-capacity silicon-based composite negative electrode material, there is a need to develop a technology capable of increasing a content of silicon for increasing a capacity, alleviating volume expansion caused by charging and discharging of the secondary battery, and suppressing formation of the oxide film due to the reaction of silicon with oxygen to prevent performance of the secondary battery from being deteriorated.

RELATED ART DOCUMENTS

Patent Documents (Patent Document 1) U.S. Pat. No. 9,911,976

SUMMARY

An embodiment of the present invention is directed to providing a negative electrode active material for a lithium secondary battery capable of having a high-capacity and long life characteristics by alleviating volume expansion caused by charging and discharging of a secondary battery and suppressing formation of an oxide film on a surface portion of a silicon layer.

Another embodiment of the present invention is directed to providing a method for preparing a negative electrode active material for a lithium secondary battery capable of having a high-capacity and long life characteristics by depositing a large amount of silicon at a small thickness on graphite particles.

Another embodiment of the present invention is directed to providing a lithium secondary battery containing the negative electrode active material for a lithium secondary battery having the advantages described above.

In one general aspect, a negative electrode active material for a lithium secondary battery includes: a carbon-based particle including pores in an inner portion and/or a surface thereof; and a silicon-based coating layer positioned on a pore surface and/or a pore-free surface of the carbon-based particle and containing silicon carbon compound.

The silicon carbon compound may satisfy $SiC_x$ ($0<x\leq2$).

The negative electrode active material according to an exemplary embodiment may further include a carbon coating layer positioned on the silicon-based coating layer.

The silicon-based coating layer may include a silicon carbon compound matrix and Si nano-particles dispersed in the matrix.

The silicon-based coating layer may further include Si nano-particles having an average particle diameter of 3 nm or more and 10 nm or less.

A degree of crystallinity of the silicon component contained in the silicon-based coating layer may be 5% or more and 40% or less, based on the degree of crystallinity obtained by dividing a peak area of crystalline silicon by the sum of a peak area of amorphous silicon and a peak area of crystalline silicon in the Raman spectrum.

A weight ratio of carbon:silicon contained the silicon-based coating layer may be 1:5 to 15.

When the negative electrode active material is left in air at 25° C. and 1 atm for 24 hours, the thickness of the oxide film formed on the surface of the silicon-based coating layer may be 1% or more and 40% or less of the total thickness of the silicon-based coating layer including the oxide film after exposure to air.

The carbon-based particle may include pores in the inner portion and the surface thereof.

The pores of the carbon-based particle may have an average particle diameter of 30 nm or more and 900 nm or less.

The number of pores most adjacent to one pore positioned in the inner portion of the carbon-based particle may be 5 to 6 based on a cross section of the carbon-based particle.

The carbon-based particle may have a BET specific surface area of 50 $m^2/g$ or more and 100 $m^2/g$ or less.

The silicon-based coating layer may have a thickness of 5 nm or more and 100 nm or less.

The silicon-based coating layer may be formed by a chemical vapor deposition (CVD) method.

The present invention includes a method for preparing the negative electrode active material described above.

In another general aspect, a method for preparing a negative electrode active material for a lithium secondary battery includes: (a) a step of mixing, stirring, and then firing a first carbon precursor and a ceramic particle for forming pores with each other; (b) a step of preparing a carbon-based particle including pores in an inner portion and/or a surface thereof by mixing an etching solution of the ceramic particle for forming pores and pulverizing; and (c) a step of forming a silicon-based coating layer containing silicon carbon compound on a pore surface and/or a pore-free surface of the carbon-based particle by a chemical vapor deposition (CVD).

The silicon carbon compound may satisfy $SiC_x$ (x is a real number greater than 0 and equal to or less than 2).

The method may further include, after the step (c), (d) a step of mixing, stirring, and then firing a second carbon precursor with the carbon-based particle.

The step (c) may include forming a silicon-based coating layer by chemical vapor deposition while simultaneously injecting a silicon precursor and a carbon precursor under an inert atmosphere.

The ceramic particle for forming pores may have an average particle diameter of 30 nm or more and 900 nm or less.

In the step (c), the silicon-based coating layer may be deposited at a thickness of 5 nm or more and 100 nm or less.

A firing temperature in the step (a) and/or the step (d) may be 600° C. or more and 1500° C. or less.

At the time of stirring in the step (a) and/or the step (d), a solvent may be sprayed.

The present invention includes a negative electrode active material prepared by the preparation method described above.

In another general aspect, there is provided a lithium secondary battery containing the negative electrode active material described above or the negative electrode active material prepared by the preparation method described above.

Other features and aspects will be apparent from the following detailed description, the drawings, and the claims.

DETAILED DESCRIPTION OF EMBODIMENTS

Figure 1:
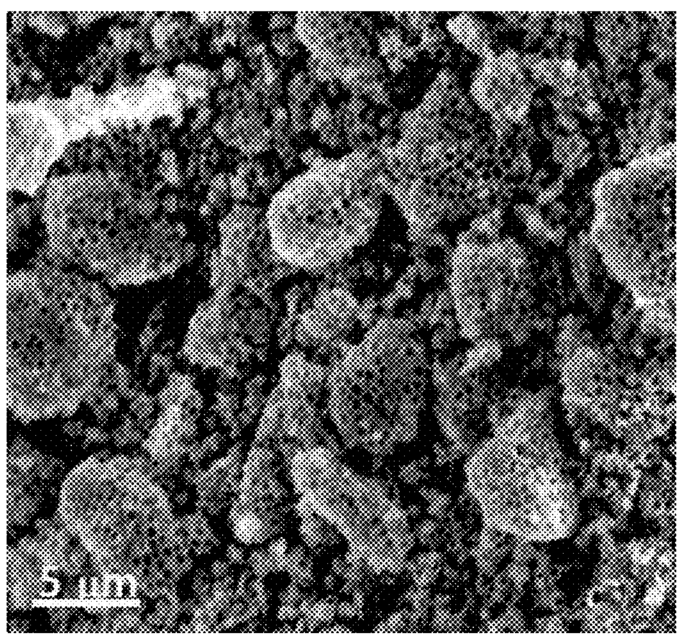
FIG. 1 is a scanning electron microscopy (SEM) photograph of a carbon-based particle prepared in Example 1.

The advantages, features, and aspects of the present invention will become apparent from the following description of the embodiments with reference to the accompanying drawings, which is set forth hereinafter. The present invention may, however, be embodied in different forms and should not be construed as being limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a negative electrode active material for a lithium secondary battery according to the present invention, a method for preparing the same, and a lithium secondary battery containing the same will be described in detail. Technical terms and scientific terms used in the detailed description and the claims have the general meaning understood by those skilled in the art to which the present invention pertains, unless otherwise defined, and a description for the known function and configuration unnecessarily obscuring the gist of the present invention will be omitted in the following description.

In addition, singular forms used in the detailed description and the claims are intended to include the plural forms unless otherwise indicated in context.

The terms "first", "second", and the like in the present detailed description and the claims are used for the purpose of distinguishing one component from another, rather than in a limiting sense.

The term "include" or "have" in the detailed description and the claims, means that there is a feature or component described in the detailed description, and does not preclude the possibility that one or more other features or components will be added, unless specifically limited.

Throughout the detailed description and the appended claims, when elements such as films (layers), regions, or components are referred to as being "on" or "above" another elements, it may be directly in contact with another elements or may have another films (layers), another regions, another components interposed therebetween.

As described above, it is expected that a demand for mid-sized to large-sized secondary batteries such as secondary batteries for electric vehicles (EVs), secondary batteries for energy storage systems (ESSs) will be rapidly increased. Therefore, the necessity to develop of a high-capacity secondary battery has increased. As an example, in order to commercialize a high-capacity silicon-based composite negative electrode material exhibiting high-capacity characteristics, the development of a technology capable of increasing a content of silicon for increasing a capacity and preventing performance of the secondary battery from being deteriorated by alleviating volume expansion caused by the charging and discharging of a secondary battery has been demanded.

The present invention relates to a negative electrode active material for a lithium secondary battery capable of implementing a high-capacity by increasing a content of silicon as compared to a negative electrode active material for a secondary battery known in the related art and implementing excellent cycle life characteristics of the secondary battery by effectively preventing an electrical isolation and delamination phenomenon due to volume expansion of a silicon-based coating layer caused by charging and discharging of a secondary battery, suppressing an oxide film from being formed on a surface of the silicon-based coating layer, and blocking a silicon interface from being directly exposed to an electrolyte to suppress occurrence of a side reaction between silicon and the electrolyte and depletion of the electrolyte.

Specifically, an aspect of the present invention provides a negative electrode active material for a lithium secondary battery including: a carbon-based particle including pores in an inner portion and/or a surface thereof; and a silicon-based coating layer positioned on a pore surface and/or a pore-free surface of the carbon-based particle and containing silicon carbon compound. That is, the negative electrode active material may include the carbon-based particle and the silicon-based coating layer containing silicon carbon compound, and the carbon-based particle may include the pores in the inner portion or the surface thereof or in the inner portion and the surface thereof, and the silicon-based coating layer may be positioned on a pore surface, the pore-free surface (surface in which a pore is not positioned), or the pore surface and the pore-free surface of the carbon-based particle. Here, the pore surface may refer to a pore face exposed to the surface, that is, a surface provided by the pore in the surface of the carbon-based particle.

According to the negative electrode active material for a lithium secondary battery according to an aspect of the present invention, since the silicon-based coating layer is positioned on the pore surface and/or the pore-free surface of the carbon-based particle including the pores in the inner portion and/or the surface thereof, the silicon-based coating layer may be thinly positioned on the carbon-based particle having a wide surface area. Therefore, the negative electrode active material may contain a large amount of silicon.

Accordingly, a capacity of the negative electrode active material may be increased, and stress due to volume expansion of the silicon-based coating layer caused by the charging and discharging of the lithium secondary battery may be decreased. As a result, a problem such as an electric peel-off phenomenon of silicon from a current collector, or the like, may be alleviated, and excellent life characteristics may be implemented.

Specifically, the silicon carbon compound contained in the silicon-based coating layer means a compound of silicon (Si) and carbon (C), and may satisfy $SiC_x$ (x is a real number greater than 0 and equal to or less than 2). Specific examples of the silicon carbon compound include, but are note limited to, $SiC_x$ ($0.5 \le x \le 2.0$), $SiC_x$ ($0.5 \le x \le 1.5$), $SiC_{0.5}$, SiC, $SiC_2$, or a mixture of thereof. The silicon carbon compound contained in the silicon-based coating layer may be crystalline silicon carbon compound, amorphous silicon carbon compound, or a composite phase in which crystalline silicon carbon compound and amorphous silicon carbon compound are mixed with each other. As an example, the silicon carbon compound may include amorphous silicon carbon compound.

Specifically, the silicon-based coating layer may further include silicon (Si) nano-particles together with the silicon carbon compound. The silicon nano-particles may have, but are not limited to, an average particle diameter of 3 nm to 10 nm, and substantially 3 nm to 8 nm. The silicon nano-particles may be, but are not necessarily limited to, crystalline silicon nano-particles. In addition, the silicon nano-particles, which are crystals, may be single crystals or polycrystals and in an exemplary embodiment, the silicon nano-particles may be single crystals. The silicon-based coating layer may further contain some amorphous phase silicon (Si) together with the crystalline silicon nano-particles. The silicon-based coating layer may contain such microfine silicon nano-particles to suppress the volume expansion of the silicon-based coating layer caused by the charging and discharging of the battery and implement excellent life characteristics of the battery.

Experimentally, the average particle diameter of the silicon nano-particles may be calculated by observing the silicon-based coating layer with a high-resolution transmission electron microscopy (HRTEM) or a scanning transmission electron microscopy (STEM), and may be calculated from converted information obtained by performing fast Fourier transform (FFT) on observed image information if necessary. Here, an average value may be a value calculated by observing any five or more regions of the silicon-based coating layer.

In a specific example, the silicon-based coating layer may have a structure in which the silicon nano-particles are dispersed in the silicon carbon compound. That is, the silicon carbon compound may form a matrix which is a continuous phase, and the silicon nano-particles may form a dispersed phase in which they are dispersed in the matrix. The silicon nano-particles may be irregularly dispersed and embedded in the silicon carbon compound matrix.

The negative electrode active material for a lithium secondary battery of an aspect of the present invention may include the silicon-based coating layer containing the silicon carbon compound and the microfine silicon nano-particles of several nanometers, on the carbon-based particle having the pores to have a buffering action against the expansion of silicon caused by the charging and discharging of the battery, and when the negative electrode active material is exposed to the air in the pulverization of the negative electrode active material, a preparation process of a negative electrode, or the like, generation of the silicon oxide film on the surface of the silicon-based coating layer may be suppressed.

Accordingly, a decrease in a life of the battery due to the expansion of the silicon may be prevented, a decrease in the capacity of the negative electrode active material due to the formation of the silicon oxide film may be prevented, and depletion of the electrolyte due to repetition of a process in which the oxide film reacts with the electrolyte and is melted at the time of driving the battery and the oxide film is formed again on the surface may be prevented.

Specifically, when the negative electrode active material for a lithium secondary electrode of an aspect of the present invention is left in the air at 25° C. and 1 atm for 24 hours, a thickness of the oxide film ($SiO_x$ (x is a real number greater than 0 and equal to or less than 2) and/or $SiO_xC_y$ (x is real number greater than or equal to 0.5 and equal to or less than 1.8, and y is a real number greater than or equal to 1 and equal to or less than 5)) formed on the surface of the silicon-based coating layer may be 1% or more and 40% or less of the total thickness of the silicon-based coating layer including the oxide film after the negative electrode active material is exposed to the air. More specifically, the thickness of the oxide film may be 5% or more and 40% or less, 10% or more and 40% or less, 20% or more and 40% or less, 20% or more and 35% or less, or 22% or more and 31% or less of the total thickness of the silicon-based coating layer including the oxide film. Experimentally, each of the thickness of the silicon-based coating layer (thickness of a coating layer that is not oxidized) and the thickness of the oxide film may be measured by high-resolution transmission electron microscopy (HRTEM) observation, scanning transmission electron microscopy (STEM) observation, or a line profile in a thickness direction using an elemental analyzer attached to a transmission electron microscopy device, or the like. Here, a boundary between the oxide film and the coating layer that is not oxidized may be determined by a difference in contrast and/or a difference in atomic distribution in the case of using the high-resolution transmission electron microscopy observation or the scanning transmission electron microscope observation, and may be determined by a content change in an element (composition change) or the like in the case of using the line profile.

The silicon-based coating layer of a negative electrode active material for a lithium secondary battery according to an aspect of the present invention may have a form in which the silicon nano-particles are dispersed in the matrix containing the silicon carbon compound. Here, the matrix containing the silicon carbon compound may include an amorphous phase, and the silicon nano-particles may include crystalline silicon and may be randomly dispersed and embedded in the matrix, but are not necessarily limited thereto.

As described above, the silicon-based coating layer according to a specific example may contain a silicon component in a form of carbide and in an intrinsic form (silicon itself) of silicon material. In an exemplary embodiment, the silicon-based coating layer may contain a silicon component in a form of carbide including an amorphous phase and in a form of particulate silicon including a crystalline phase. Accordingly, a silicon component contained in the silicon-based coating layer may have low crystallinity. Here, the silicon component refers to both of silicon of the silicon carbon compound and silicon of the silicon nano-particles. The low crystallity of the silicon component may greatly reduce a volume change generated at the time of the charging and discharging of the lithium second battery to significantly reduce stress caused in the negative electrode active material.

Typically, when the coating layer containing the silicon has high crystallinity, a selective reaction on a specific crystal surface is induced, such that anisotropic expansion of the coating layer is generated. The coating layer is subjected to a large stress, such that deterioration of the negative electrode active material and degradation of battery characteristics are generated. On the other hand, when the silicon component has low crystallinity, a non-selective alloying reaction between the silicon component and lithium and isotropic expansion of the coating layer is generated, and stress caused by the isotropic expansion is also small, such that battery characteristics may be improved.

Specifically, a degree of crystallinity the silicon component in the silicon-based coating layer may be 5% or more and 40% or less, more specifically, 10% or more and 30% or less, 20% or more and 30% or less, or 20% or more and 25% or less. Specifically, the degree of crystallinity may be a ratio (×100(%)) obtained by dividing a peak area of the crystalline silicon by the sum of a peak area of the amorphous silicon and the peak area of the crystalline silicon on the Raman spectrum of the silicon-based coating layer. Experimentally, Raman spectroscopic analysis of the silicon-based coating layer may be performed under conditions in which laser is a 488 nm argon laser, a laser intensity is 0.1 to 1 mW, an exposure time is 100 seconds, and the number of times of integration is one, but is not necessarily limited thereto. A peak of a wavenumber range between 500 and 520 $cm^{-1}$ on the Raman spectrum may correspond to a peak of the silicon in the crystalline state, and a peak in a wavenumber range between 460 and 490 $cm^{-1}$ on the Raman spectrum may correspond to a peak of the silicon in the amorphous state. However, the peak of amorphous silicon and the peak of crystalline silicon may be selected by positions of conventionally known peaks.

In the negative electrode active material for a lithium secondary battery according to an aspect of the present invention, a weight ratio of carbon:silicon contained in the silicon-based coating layer may be 1:5 to 15, specifically, 1:8 to 12, and more specifically, 1:8 to 10. Due to the silicon-based coating layer containing the silicon component in a high content, the negative electrode active material may have excellent capacity characteristics. Experimentally, the weight ratio of carbon:silicon contained in the silicon-based coating layer may be calculated by an energy dispersive spectrometry (EDS) attached to a high-resolution transmission electron microscope device or a scanning transmission electron microscope device, and may be calculated by averaging elemental analysis results of silicon and carbon obtained by scanning electron beams to any ten or more positions belonging to a silicon-based coating layer region by electron microscope observation or from the line profile in the thickness direction. The energy dispersive spectrometry may be performed under conditions in which a working distance is about 1 mm, a beam size is about 1 μm, and an irradiation time is 1 second or more, but is not necessarily limited thereto.

The negative electrode active material for a lithium secondary battery according to an aspect of the present invention may further include a carbon coating layer positioned on the silicon-based coating layer. In this case, it is possible to suppress direct exposure of the silicon of the silicon-based coating layer to the electrolyte to decrease a side reaction of the electrolyte, and it is also possible to alleviate volume expansion at the time of the charging and discharging of the lithium secondary battery to improve life characteristics of the lithium secondary battery.

In the negative electrode active material for a lithium secondary battery according to an aspect of the present invention, the silicon-based coating layer may be formed by a chemical vapor deposition (CVD) method.

In the case of forming the silicon-containing coating layer on a carbon-based particle in which pores are not present by chemical vapor deposition (CVD) as in the related art, a thickness of the silicon-based coating layer cannot but be increased in order to coat a large amount of silicon. Therefore, there was a problem that large stress is generated due to the volume expansion of the silicon caused by the charge and discharge of the lithium secondary battery.

The negative electrode active material for a lithium secondary battery according to an aspect of the present invention including porous carbon-based particle may solve the problem in the related art. Specifically, it is possible to coat the large amount of silicon at a small thickness in spite of using the chemical vapor deposition (CVD) method which is advantageous for uniform coating of the silicon-based coating layer. Accordingly, in the negative electrode active material for a lithium secondary battery according to an aspect of the present invention, the large amount of silicon may be uniformly and thinly coated, such that a capacity may be increased and the stress due to the volume expansion of the silicon-based coating layer caused by the charging and discharging of the lithium secondary battery may be decreased. As a result, excellent life characteristics of the lithium secondary battery may be implemented.

The carbon-based particle including the pores may include the pores specifically in the inner portion and on the surface thereof. The carbon-based particle includes the pores in the inner portion thereof as well as on the surface thereof, and the silicon is deposited in the inner portion, in the pores on the surface, and on the pore-free surface of the carbon-based particle, such that the negative electrode active material may include a large amount of silicon at a small thickness.

In addition, the pores positioned in the surface of the carbon-based particle and the pores positioned in the inner portion of the carbon-based particle may be in communication (connected) with each other. Accordingly, in the case of using the chemical vapor depositon (CVD) method, the silicon-based coating layer is also positioned in the pores in the inner portion of the carbon-based particle, such that in spite of the volume expansion and delamination of some silicon of the silicon-based coating layer caused by the charging and discharging of the lithium secondary battery, silicon may remain without being lost in spaces of the pores in the inner portion of the carbon-based particle, and a contact between the silicon and the electrolyte may be prevented. Therefore, even though the charge and discharge of the lithium secondary battery are repeated, a high-capacity may be maintained.

Specifically, the carbon-based particle may include spherical pores as the pores positioned in the inner portion of the carbon-based particle, and may have a porous structure in which it is filled with spherical pores over the entirety of the carbon-based particle (entire region from the center to the surface of the carbon-based particle). As a substantial example, the number of pores most adjacent to one pore positioned in the inner portion of the carbon-based particle may be 5 to 6 based on a cross section of the carbon-based particle. The number most adjacent pores may also be referred to as a coordination number and may refer to the number of closest neighbor pores surrounding any one pore. The meaning that the average number of most adjacent pores is 5 to 6, specifically, 5.5 to 6, and more specifically, 5.8 to 6, is that a structure of the pores distributed three-dimensionally over the entirety of the carbon-based particle is substantially the closest-packed structure (face-centered cubic structure or dense hexagonal structure). In an exemplary embodiment, the carbon-based particle may have a pore structure in which spherical pores are closest packed. Due to the closest-packed pore structure, a surface area of the carbon-based particle on which the coating layer is formed may be increased, and the silicon-based coating layer may also be formed in the pores positioned in the inner portion of the carbon-based particle, specifically, internal pores positioned in a region adjacent to the surface at the time of the chemical vapor deposition. Here, the region adjacent to the surface may refer to, but is not necessarily limited to, a region from the surface to a depth of 5% Rc (0.05 Rc) to 20% Rc (0.20 Rc) on the basis of Rc, which is an average radius of the carbon-based particle.

In a specific example, an average particle diameter of the pores of the carbon-based particle may be 30 nm or more and 900 nm or less. However, the present invention is not limited thereto. More specifically, the average particle diameter may be 50 nm or more and 700 nm or less, 50 nm or more and 600 nm or less, 50 nm or more and 500 nm or less, 100 nm or more and 400 nm or less, 150 nm or more and 350 nm or less, or 200 nm or more and 300 nm or less. In this case, life characteristics of the lithium secondary battery may be more excellent.

The reason will be described in detail. When the average particle diameter of the pores of the carbon-based particle is relatively small, a ratio of the silicon-based coating layer filling an internal space of the carbon-based particle is increased, such that an effect of decreasing the stress caused by the charging and discharging of the lithium secondary battery is relatively small, and partial capacity loss due to the volume expansion and the delamination may thus be generated. On the other hand, when the average particle diameter of the pores of the carbon-based particle is relatively large, a portion in which the silicon-based coating layer is not firmly coated on the surface of the carbon-based particle is generated, such that partial capacity loss may be generated because of the silicon loss due to the volume expansion and the delamination caused by the charging and discharging of the lithium secondary battery.

The negative electrode active material for a lithium secondary battery according to an aspect of the present invention is not particularly limited, but may include 50 wt % or more and 80 wt % or less of the carbon-based particle and 20 wt % or more and 50 wt % or less of the silicon-based coating layer based on a total weight of the negative electrode active material. Further, when the negative electrode active material for a lithium secondary battery further includes the carbon coating layer on the silicon-based coating layer, the negative electrode active material may include 5 to 20 parts by weight of the carbon coating layer based on 100 parts by weight of the total weight of the carbon-based particle and the silicon-based coating layer.

In the negative electrode active material for a lithium secondary battery according to an aspect of the present invention, the carbon-based particle including the pores may have a BET specific surface area of 50 $m^2/g$ or more and 100 $m^2/g$ or less. The negative electrode active material for a lithium secondary battery includes the carbon-based particle having such a high specific surface area, such that a large amount of silicon may be coated at a small thickness, and a capacity of the lithium secondary battery may thus be improved. However, the present invention is not necessarily limited thereto.

In the negative electrode active material for a lithium secondary battery according to an aspect of the present invention, a thickness of the silicon-based coating layer may be, but is particularly limited to, 5 nm or more and 100 nm or less. More specifically, the thickness of the silicon-based coating layer may be 5 nm or more and 80 nm or less, 5 nm or more and 50 nm or less, 5 nm or more and 40 nm or less, or 5 nm or more and 30 nm or less.

This range may be a thickness range very smaller than that of the related art, and may be a result obtained since it is possible to coat the large amount of silicon.

Accordingly, the large amount of silicon may be thinly coated on the surface of the carbon-based particle including the pores, and excellent capacity characteristics and life characteristics may thus be implemented.

Meanwhile, the negative electrode active material for a lithium secondary battery further includes the carbon coating layer on a boundary between the carbon-based particle and the silicon-based coating layer and the outermost portion thereof, a boundary between the silicon-based coating layer and the carbon coating layer may be confirmed through, for example, a cross-sectional scanning electron microscope (SEM) photograph, or transmission electron microscope photograph or the like, from which a thickness of each of the layers may be measured.

When the negative electrode active material for a lithium secondary battery according to an aspect of the present invention further includes the carbon coating layer at the outermost portion thereof, a thickness of the carbon coating layer is not particularly limited, but may be 0.01 μm or more and 10 μm or less, specifically, 0.1 μm or more and 5 μm or less, and more specifically, 0.1 μm or more and 1 μm or less. The carbon coating layer may prevent the silicon-based coating layer from directly contacting the electrolyte by having such a thickness.

The carbon-based particle of the negative electrode active material according to an aspect of the present invention may be a graphite particle in which pores are artificially formed or may be a carbon body (pyrolysis carbon) prepared by firing a carbon precursor such as pitch so that pores are formed, and is not limited to a specific aspect.

An average particle diameter of the carbon-based particle of the negative electrode active material according to an aspect of the present invention is not particularly limited, but may be 1 μm or more and 100 μm or less, specifically, 3 μm or more and 40 μm or less, and more specifically, 3 μm or more and 20 μm or less.

Meanwhile, the average particle diameter of the carbon-based particle may refer to a value measured as a volume average value D50 (that is, a particle diameter when a cumulative volume is 50%) in particle diameter distribution measurement by a laser light diffraction method.

The present invention includes a method for preparing a negative electrode active material for a lithium secondary battery.

The method for preparing a negative electrode active material for a lithium secondary battery according to an aspect of the present invention includes: (a) a step of mixing, stirring, and then firing a first carbon precursor and a ceramic particle for forming pores with each other; (b) a step of preparing a carbon-based particle including pores in an inner portion and/or a surface thereof by mixing an etching solution of the ceramic particle for forming pores, and pulverizing; and (c) a step of forming a silicon-based coating layer on the pore surface and/or a pore-free surface of the carbon-based particle by a chemical vapor deposition (CVD) method. In detail, the method for preparing a negative electrode active material may include: a step of mixing, stirring, and then firing a first carbon precursor and a ceramic particle for forming pores to prepare a ceramic particle-carbon composite; a step of mixing the prepared ceramic particle-carbon composite with an etching solution (an etching solution of the ceramic particle) and pulverizing the ceramic particle-carbon composite to prepare a porous carbon-based particle (carbon-based particle including pores in an inner portion and/or a surface thereof) from which the ceramic particle is removed from the ceramic particle-carbon composite; and a step of forming a silicon-based coating layer on the pore surface and/or a pore-free surface of the porous carbon-based particle by a CVD method.

This method is a method capable of preparing the negative electrode active material according to an aspect of the present invention described above. The method has an advantage in that the negative electrode active material according to the present invention may be mass-produced through a significantly simple process such as the firing of the carbon precursor, the etching of the ceramic particle for forming pores, and the coating of the silicon-based coating layer by the CVD method.

In addition, it is possible to coat a large amount of silicon at a small thickness even in spite of using the CVD method advantageous for uniform coating of the silicon-based coating layer. Accordingly, a capacity of the negative electrode active material may be increased, and stress due to volume expansion of the silicon-based coating layer caused by the charging and discharging of the lithium secondary battery may be decreased, such that a high-capacity and excellent life characteristics of the lithium secondary battery may be implemented.

Hereinafter, the method for preparing a negative electrode active material will be described in more detail.

First, in the step (a), the first carbon precursor and the ceramic particle for forming pores are mixed, stirred, and then sintered. Through the mixing and stirring in the present step, it is possible to first obtain a precursor in which the ceramic particle for forming pores is dispersed in an inner portion and/or a surface of a first carbon precursor matrix.

The first carbon precursor may be a liquid (including molten phase) carbon source. In the case of using the liquid carbon source as the first carbon precursor, the ceramic particle for forming pores can easily form the closest-packed structure, and at the time of firing (heat treatment) for carbonization (pyrolysis) of the first carbon precursor, it is possible to prepare a ceramic particle-carbon composite in which the closest-packed structure of the ceramic particle is substantially maintained intact by a high carbonization yield. Specific examples of the liquid carbon source include pitch, a furan resin, a phenol resin, a rayon-based resin, an epoxy-based resin, and the like. As a substantial example, the liquid carbon source may be pitch, and the pitch may include isotropic pitch, mesophase pitch, or a mixture thereof. The pitch is more advantageous than other liquid carbon sources (e.g., a furan resin and a phenol resin) in the term of a high carbonization yield, low viscosity, excellent wettability with the ceramic particle, and the like but the liquid carbon source is not interpreted to be limited only to the pitch.

In the present step, at the time of mixing the first carbon precursor and the ceramic particle, the ceramic particle in a mixture may be 50 to 80 wt %, and specifically, 60 to 80 wt %, but is not limited thereto.

In the present step, at the time of stirring the first carbon precursor and the ceramic particle, an organic solvent may be sprayed in order to more smoothly and uniformly disperse the ceramic particle for forming pores. A small amount of the organic solvent is sprayed, such that the ceramic particle for forming pores may be more homogeneously dispersed and positioned in the first carbon precursor matrix. Therefore, the silicon-based coating layer may be more uniformly formed in a post-process. The organic solvent may include, but is not limited to, for example, a polar organic solvent such as gamma-butyrolactone, formamide, dimethylformamide, diformamide, acetonitrile, tetrahydrofuran, dimethyl sulfoxide, diethylene glycol, 1-methyl-2-pyrrolidone, N,N-dimethylacetamide, acetone, α-terpineol, β-terpineol, dihydro terpineol, 2-methoxy ethanol, acetylacetone, methanol, ethanol, propanol, isopropanol, butanol, pentanol, hexanol, ketone, methyl isobutyl ketone, and tetrahydrofuran.

The stirring method may be a mechanical stirring method, and may be performed by a particle mixer. The particle mixer is not particularly limited, but may be a rotating stirrer, a revolution stirrer, a blade mixer, or a particle fusion device.

The first carbon precursor and the ceramic particle for forming pores may be mixed and then fired at a high temperature to obtain a carbon body having the ceramic particle for forming pores dispersed in an inner portion and/or a surface thereof.

The firing in the step (a) may be performed under an inert atmosphere, for example, an argon (Ar), helium (He), or nitrogen ($N_2$) atmosphere. However, the present invention is not limited thereto.

In addition, a firing temperature in the step (a) is not particularly limited, but may be 600° C. or more and 1500° C. or less, and specifically, 800° C. or more and 1000° C. or less. A firing pressure and a firing time may be appropriately adjusted if necessary and are not limited to a specific range.

Then, in the step (b), the etching solution of the ceramic particle for forming pores is mixed with the first carbon precursor and the ceramic particle and then pulverized to prepare the carbon-based particle including the pores in the inner portion and/or the surface thereof.

In the present step, the ceramic particle for forming pores dispersed in the inner portion and/or the surface of the carbon body is etched by the etching solution, such that the pores may be formed in the inner portion and/or the surface of the carbon body. Accordingly, it is possible to form a porous carbon body having a high specific surface area, and it may be possible to deposit a large amount of silicon at a small thickness by the CVD method which is a post-process.

The ceramic particle for forming pores and the etching solution are not limited to specific materials, and may be used without being limited as long as the ceramic particle is stable at the firing temperature in the step (a) and is wet etchable and the etching solution is capable of etching the ceramic particle. As a non-restrictive example, silica ($SiO_2$) may be used as the ceramic particle for forming pores, and a sodium hydroxide (NaOH) solution may be used as the etching solution. 15 [00104] The pulverizing in the step (b) may be performed by well-known mechanical pulverization such as a ball mill, and the present invention is not limited thereto.

An average particle diameter of the ceramic particle for forming pores may be 30 nm or more and 900 nm or less. However, the present invention is not limited thereto. More specifically, the average particle diameter may be 50 nm or more and 700 nm or less, 50 nm or more and 600 nm or less, 50 nm or more and 500 nm or less, 100 nm or more and 400 nm or less, 150 nm or more and 350 nm or less, or 200 nm or more and 300 nm or less. In this case, life characteristics of the lithium secondary battery using the prepared negative electrode active material may be more excellent.

Then, in the step (c), the silicon-based coating layer is formed on the pore surface and/or the pore-free surface of the carbon-based particle by the CVD method. Through the present step, it is possible to coat a large amount of silicon at a small thickness even in spite of using the CVD method advantageous for uniform coating of the silicon-based coating layer. Accordingly, since a large amount of silicon may be uniformly coated on the porous carbon-based particle, a capacity may be increased, and the stress due to the volume expansion of the silicon-based coating layer caused by the charging and discharging of the lithium secondary battery may be decreased. As a result, excellent life characteristics of the lithium secondary battery may be implemented.

In the present step, the silicon-based coating layer may be formed while simultaneously injecting a silicon precursor gas and a carbon precursor gas. The silicon precursor gas and the carbon precursor gas may be silane gas ($SiH_4$) and a C1-C2 hydrocarbon gas such as an acetylene gas ($C_2H_2$) or a methane gas, respectively, but are not necessarily limited thereto.

In the present step, the silicon-based coating layer including a silicon carbon compound matrix and Si may be formed while simultaneously injecting a silicon precursor gas and a carbon precursor gas.

In addition, a ratio, an injection rate, or the like, of the silicon precursor gas and the carbon precursor gas is not limited as long as the coating layer satisfying a weight ratio of carbon:silicon of 1:5 to 15, specifically, 1:8 to 12, and more specifically, 1:8 to 10 is deposited. A deposition temperature at the time of depositing the silicon-based coating layer may be 500 to 700° C., but is not limited thereto.

In the step (c), the silicon-based coating layer may be deposited at a thickness of 5 nm or more and 100 nm or less. More specifically, the silicon-based coating layer may be deposited at a thickness of 5 nm or more and 80 nm or less, 5 nm or more and 50 nm or less, 5 nm or more and 40 nm or less, or 5 nm or more and 30 nm or less.

This range may be a thickness range very smaller than that of the related art, and may be a result obtained since the negative electrode active material includes the porous carbon-based particle, such that it is possible to coat the large amount of silicon at a small thickness. Accordingly, the large amount of silicon may be thinly coated on the surface of the carbon-based particle, such that excellent capacity characteristics and life characteristics of the lithium secondary battery may be implemented.

Then, (d) a step of mixing, stirring, and firing a second carbon precursor with the carbon-based particle may be further performed. Accordingly, it is possible to allow silicon not to be exposed to a surface by covering the silicon-based coating layer with the carbon coating layer. As a result, a silicon particle exposed to a surface of the finally prepared negative electrode active material is significantly decreased, such that direct exposure of silicon to the electrolyte is blocked, and it is thus possible to improve life characteristics of the lithium secondary battery.

In addition, as an example, in the method for preparing a negative electrode active material according an aspect of the present invention, at the time of the firing in the step (d), silicon (Si) in the silicon-based coating layer is crystallized. However, an increase in a size of a crystal grain of silicon (Si) may be prevented due to the amorphous silicon carbon compound matrix, and a silicon component in the silicon-based coating layer may maintain a low degree of cyrstallinity. Accordingly, characteristics of the negative electrode active material for a lithium secondary battery according to an aspect of the present invention described above may be implemented.

In the present step, the stirring may be a mechanical stirring, and may be performed by a particle mixer. The particle mixer is not particularly limited, but may be a rotating stirrer, a revolution stirrer, a blade mixer, or a particle fusion device.

The second carbon precursor may also be a liquid carbon source, and may be, but is not limited to, a liquid carbon source selected from pitch, a furan resin, aphenol resin, a rayon-based resin, an epoxy-based resin, and the like independently of the first carbon precursor.

Further, the first carbon precursor in the step (a) and the second carbon precursor in the step (d) may also be the same as or different from each other.

In the present step, at the time of mixing the carbon-based particle on which the silicon-based coating layer is formed and the second carbon precursor, a content of the second carbon precursor in a mixture may be 10 to 20 wt %, but is not limited thereto.

In the present step, at the time of the stirring, an organic solvent may be sprayed for smoother dispersion. In this case, densification of the carbon coating layer formed from the second carbon precursor may be improved through the smoother dispersion, and it is possible to expect improvement of battery characteristics.

The firing in the step (d) may be performed under an inert atmosphere, for example, an argon (Ar), helium (He), or nitrogen ($N_2$) atmosphere.

A firing temperature in the step (d) is not particularly limited, but may be 600° C. or more and 1500° C. or less, and specifically, 800° C. or more and 1000° C. or less. A firing pressure and a firing time may be appropriately adjusted if necessary and are not limited to specific ranges.

Another aspect of the present invention provides a lithium secondary battery containing the negative electrode active material according to an aspect of the present invention described above.

The lithium secondary battery is a lithium secondary battery whose stability is secured, volume expansion may be alleviated, a capacity is increased, and characteristics such as life characteristics are improved even though the lithium ion battery is repeatedly charged and discharged, by including a negative electrode containing the negative electrode active material having the characteristics described above.

The lithium secondary battery may include a negative electrode containing the negative electrode active material according to an aspect of the present invention, a positive electrode, and an electrolyte, and further include a separator between the positive electrode and the negative electrode.

The negative electrode may be manufactured by mixing and stirring a solvent and, as necessary, a negative electrode binder and a conductive material with a negative electrode active material to prepare a slurry, applying the slurry to a current collector, compressing, and then drying the slurry to form a negative electrode active material layer on the current collector. Since a description of the mixed negative electrode active material is as described above, a description thereof will be omitted.

Hereinafter, the current collector, the negative binder and the conductive material will be described in more detail. However, the present invention is not limited thereto.

The negative electrode binder may serve to adhere negative electrode active material particles well to each other and adhere the negative electrode active material well to the current collector. As the binder, a water-insoluble binder, a water-soluble binder, or a combination thereof may be used.

Examples of the water-insoluble binder may include polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, polyamideimide, polyimide, or a combination thereof.

Examples of the water-soluble binder may include styrene-butadiene rubber, acrylated styrene-butadiene rubber, polyvinyl alcohol, sodium polyacrylate, a copolymer of propylene and an olefin having 2 to 8 carbon atoms, a copolymer of (meth)acrylic acid and (meth)acrylic acid alkyl ester, or a combination thereof.

In the case of using the water-soluble binder as the negative electrode binder, the binder may further contain a cellulose-based compound capable of imparting viscosity. As the cellulose based compound, one or more of carboxymethyl cellulose, hydroxypropylmethyl cellulose, methyl cellulose, or alkali metal salts thereof may be used in combination. As the alkali metal, Na, K, or Li may be used.

The conductive material is used in order to impart conductivity to an electrode, and any conductive material may be used as the conductive material as long as it does not cause a chemical change in a battery and is an electronically conductive material. Examples of the conductive material may include a carbon-based material such as natural graphite, artificial graphite, carbon black, acetylene black, ketjen black, carbon fiber, carbon nanotube; a metal-based material such as metal powder or metal fiber of copper, nickel, aluminum, silver, or the like; a conductive polymer such as a polyphenylene derivative; or a mixture thereof.

Further, as a material of the current collector, a current collect selected from the group consisting of copper foil, nickel foil, stainless steel foil, titanium foil, nickel foam, copper foam, a polymer substrate coated with a conductive metal, and a combination thereof may be used.

The positive electrode may include a current collector and a negative electrode active material layer positioned on the current collector. A material of the current collector may be Al or Cu, but is not limited thereto.

As a positive electrode active material, a compound capable of reversibly intercalating and deintercalating lithium (a lithiated intercalation compound) may be used. Specifically, the lithium metal oxide may be, for example, one or more of a complex oxide of metal and lithium selected from cobalt, manganese, nickel, and combinations thereof known in the art, and is not particularly limited to a specific composition.

The positive electrode active material layer may further include a positive electrode binder and a conductive material.

The binder serves to adhere positive electrode active material particles well to each other and adhere the positive electrode active material well to the current collector. A representative example of the binder may be polyvinyl alcohol, carboxymethyl cellulose, hydroxylpropyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, but is not limited thereto.

The conductive material is used in order to impart conductivity to the electrode, and any conductive material may be used as the conductive material as long as it does not cause a chemical change in a battery and is an electrically conductive material. Examples of the conductive material may include natural graphite, artificial graphite, carbon black, acetylene black, ketjen black, carbon fiber, carbon nanotube, metal powder or metal fiber made of copper, nickel, aluminum, silver, or the like. In addition, one or a mixture of one or more of conductive materials such as a polyphenylene derivative may be used, but the conductive material is not limited thereto. 25 [00137] The lithium secondary battery may be a non-aqueous electrolyte secondary battery. Here, a non-aqueous electrolyte may contain a non-aqueous organic solvent and a lithium salt.

The non-aqueous organic solvent serves as a medium through which ions participating in an electrochemical reaction of the battery may move.

The non-aqueous organic solvent and the lithium salt may be materials generally used in a technical field of the lithium secondary battery, and are not limited to specific materials.

In addition, as previously described, the separator may be present between the positive electrode and the negative electrode. The separator may be a film of polyethylene, polypropylene, polyvinylidene fluoride or a multilayer film of two or more layers thereof, and may be a mixed multi-layer film such as a two-layer separator of polyethylene/polypropylene, a three-layer separator of polyethylene/polypropylene/polyethylene, a three-layer separator of polypropylene/polyethylene/polypropylene, and the like, but is not particularly limited.

Hereinafter, Examples of the present invention and Comparative Examples will be described. However, the following Examples are only an exemplary embodiment of the present invention, and the present invention is not limited thereto.

Evaluation Method

(1) Measurement of Initial Discharging Capacity

A battery was charged by applying a constant current of 0.1 C rate until a voltage of the battery reaches 0.01 V (vs. Li) at 25° C. and applying a constant voltage until a current reaches 0.01 C rate when the voltage of the battery reaches 0.01 V. At the time of discharging the battery, the battery was discharged at a constant current of 0.1 C rate until the voltage reaches 1.5 V (vs. Li).

(2) Evaluation of Life Characteristics

A battery was charged by applying a constant current of 0.5 C rate at 25° C. until a voltage of the battery reaches 0.01 V (vs. Li) and applying a constant voltage until a current reaches 0.01 C rate when the voltage of the battery reaches 0.01 V (vs. Li). At the time of discharging of the battery, the battery was discharged at a constant current of 0.5 C rate until the voltage reaches to 1.5 V, and the charging-discharging cycle was repeated 50 times.

Example 1

70 wt % of silica ($SiO_2$) particles having an average particle diameter of 250 nm and 30 wt % of pitch (viscosity at 25° C.: ≥$10^5$ cP) were mixed with each other without using a solvent, and were then mechanically stirred with each other to obtain a precursor in which the silica particles are positioned in a dispersed form in an inner portion and on a surface of a pitch matrix.

The precursor was fired at 900° C. for 1 hour under a nitrogen ($N_2$) atmosphere, and then mixed and stirred with a 3M NaOH solution for 6 hours to etch the silica particles.

Thereafter, the resulting precursor was centrifuged and washed to remove residual NaOH and pulverized to obtain carbon-based particle having an average particle diameter of 5 μm and including pores in the inner portion and the surface thereof.

A negative electrode active material was prepared by chemically depositing $SiH_4$(g) and $C_2H_2$(g) on the carbon-based particle while injecting $SiH_4$(g) and $C_2H_2$(g) at a rate of 100 sccm ($SiH_4$(g)) and at a rate of 20 sccm ($C_2H_2$(g)), respectively, at 600° C. for 1 hour under an inert ($N_2$) atmosphere to form a silicon-based coating layer by a CVD method.

The obtained negative electrode active material had a form in which the silicon-based coating layer is positioned in pores and on a pore-free surface of the carbon-based particle including the pores in an inner portion and a surface thereof.

Example 2

A negative electrode active material was prepared in the same manner as that of Example 1 except that silica particles having an average particle diameter of 150 nm were used.

Example 3

A negative electrode active material was prepared in the same manner as that of Example 1 except that silica particles having an average particle diameter of 350 nm were used.

Example 4

After forming the silicon-based coating layer in Example 1, it was mixed with 20 parts by weight of pitch based on 100 parts by weight of the total amount of the negative electrode active material on which the silicon-based coating layer was formed, and fired at 900° C. for 1 hour under an inert ($N_2$) atmosphere to form a carbon coating layer on the outermost layer.

The obtained negative electrode active material had a form in which the silicon-based coating layer is positioned in the pore surface and on the pore-free surface of the carbon-based particle including the pores in the inner portion and the surface thereof; and a carbon coating layer is positioned on the silicon-based coating layer.

Example 5

After forming the silicon-based coating layer in Example 2, a carbon coating layer was formed on the outermost layer in the same manner as that of Example 4.

Example 6

After forming the silicon-based coating layer in Example 3, a carbon coating layer was formed on the outermost layer in the same manner as that of Example 4.

Figure 2:
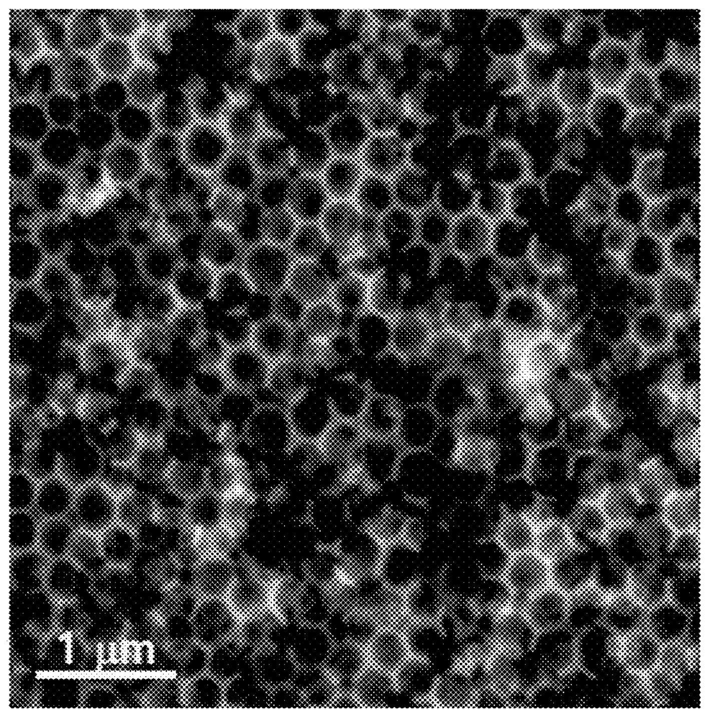
FIG. 2 is an SEM photograph obtained by photographing surfaces of a carbon-based particle prepared in Example 1 with a magnification enlarged from FIG. 1.

FIG. 1 is a scanning electron microscopy (SEM) (model name: Verios 460, manufactured by FEI) photograph of the carbon-based particle prepared in Example 1. FIG. 2 is an SEM photograph obtained by photographing surfaces of the carbon-based particle prepared in Example 1 with a magnification enlarged from FIG. 1.

The carbon-based particle in which spherical pores are closest packed in the inner portion and the surface thereof may be confirmed.

Figure 3:
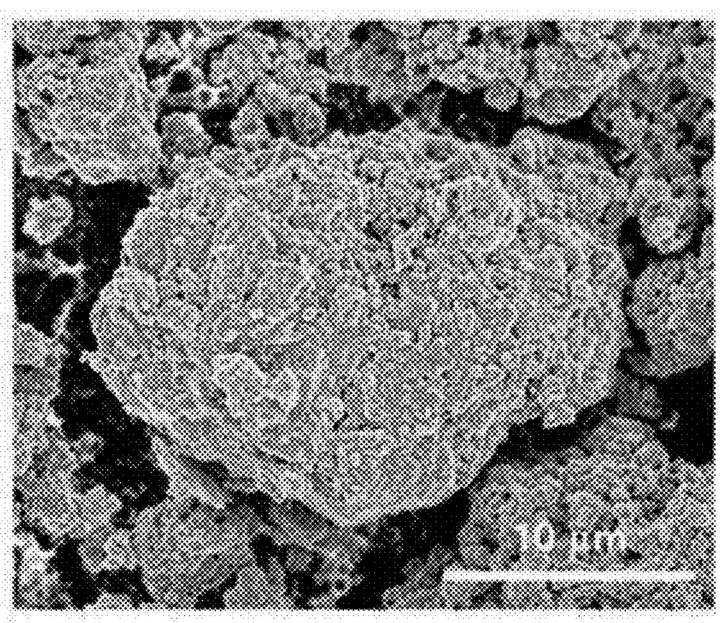
FIG. 3 is an SEM photograph of a negative electrode active material prepared in Example 1.
Figure 4:
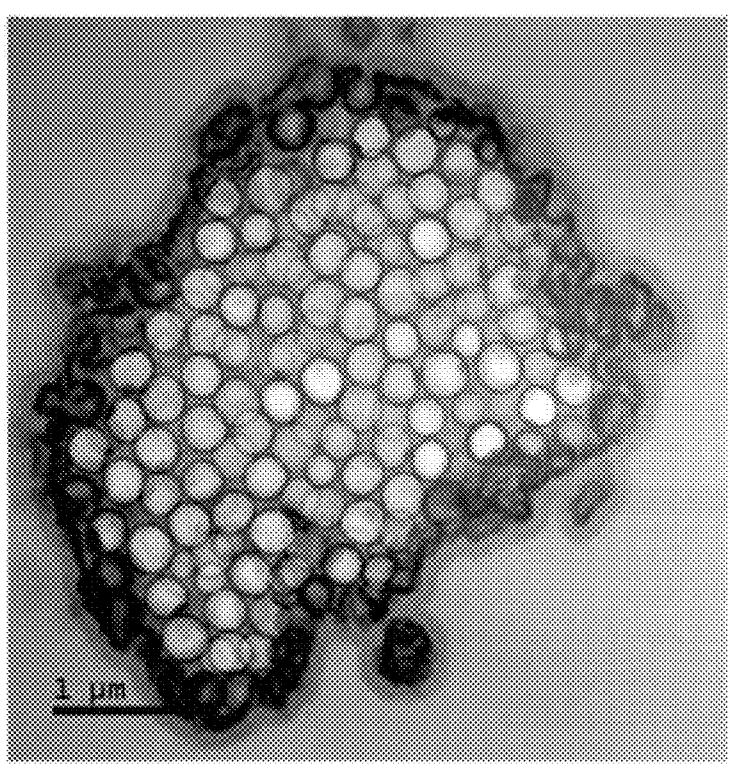
FIG. 4 is a cross-sectional scanning transmission electron microscopy (STEM) photograph of the negative electrode active material prepared in Example 1.

FIG. 3 is an SEM photograph of the negative electrode active material prepared in Example 1. FIG. 4 is a cross-sectional STEM (model name: ARM 300, manufactured by JEOL) photograph of the negative electrode active material prepared in Example 1.

It can be confirmed that in which a silicon-based coating layer was formed in the inner portion, in the pores on the surface, and on the pore-free surface of the carbon-based particle having pores in the inner portion and the surface thereof.

It was confirmed that as a result of analyzing the composition of the silicon-based coating layer on the cross-section of the negative electrode active material prepared in Example 1 using an energy spectroscopic analysis device attached to a high-resolution transmission electron microscope, a coating layer containing 91.2 wt % of silicon and 8.8 wt % of carbon was prepared.

Comparative Example 1

Chemical deposition was performed on graphite particles having an average particle diameter of 15 μm without pores with $SiH_4$ (g) at a rate of 100 sccm and $C_2H_2$ (g) at a rate of 20 sccm, respectively, at 600° C. for 0.5 hours under an inert ($N_2$) atmosphere to form a silicon-based coating layer by a chemical vapor deposition method.

Comparative Example 2

After forming the silicon-based coating layer in Comparative Example 1, it was mixed with 5 parts by weight of pitch based on 100 parts by weight of the total amount of the negative electrode active material on which the silicon-based coating layer was formed, and fired at 900° C. for 1 hour under an inert ($N_2$) atmosphere to form a carbon coating layer on the outermost layer.

Comparative Example 3

Chemical deposition was performed on the carbon-based particle including pores in the inner portion and the surface thereof, prepared in Example 1 while injecting $SiH_4$ (g) at a rate of 100 sccm at 600° C. for 1 hour under an inert ($N_2$) atmosphere to form a Si coating layer by a chemical vapor deposition method to prepare a negative electrode active material.

Comparative Example 4

After forming the Si coating layer in Comparative Example 3, it was mixed with 20 parts by weight of pitch based on 100 parts by weight of the total amount of the negative electrode active material on which the Si coating layer was formed, and fired at 900° C. for 1 hour under an inert ($N_2$) atmosphere to form a carbon coating layer on the outermost layer.

Figure 5:
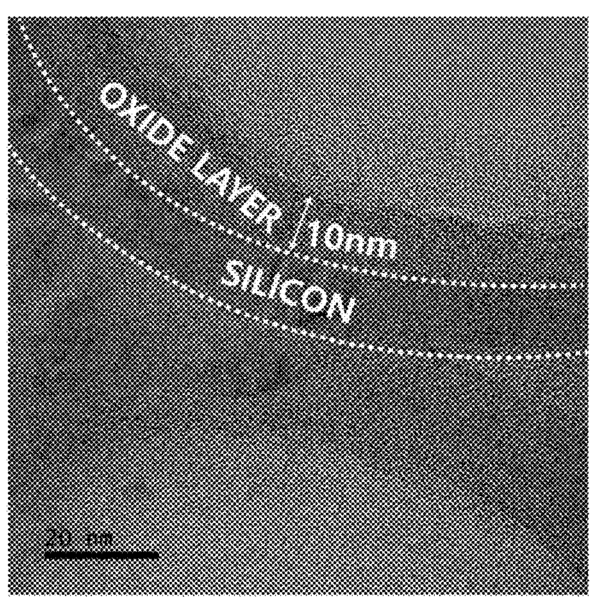
FIG. 5 is a high-resolution transmission electron microscopy photograph of an oxide film layer generated on a surface of an Si coating layer of a negative electrode active material prepared in Comparative Example 3.
Figure 6:
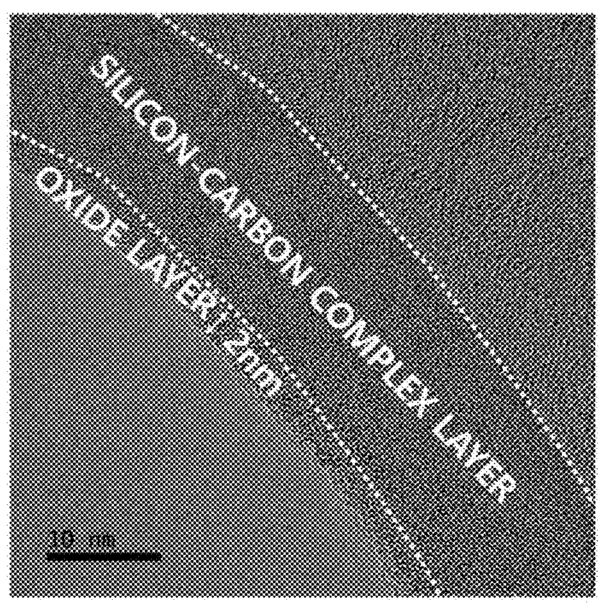
FIG. 6 is a high-resolution transmission electron microscopy photograph of an oxide film layer generated on a surface of a silicon carbon compound coating layer of the negative electrode active material prepared in Example 1.

FIG. 5 is a high-resolution transmission electron microscopy photograph of the oxide film layer generated on the surface of the Si coating layer after the negative electrode active material prepared in Comparative Example 3 was left in the air at 25° C. and 1 atm for 24 hours. FIG. 6 is a high-resolution transmission electron microscopy photograph of an oxide film layer generated on the surface of a silicon-based coating layer after the negative electrode active material prepared in Example 1 was left in air under the same conditions.

It could be confirmed that the negative electrode active material prepared in Example 1 inhibited the formation of the oxide film layer on the surface of the silicon-based coating layer as compared to the negative electrode active material prepared in Comparative Example 3.

Table 1 summarizes the generation degree of the oxide film layer generated on the surface of the silicon-based coating layer or the Si coating layer, after the negative electrode active material prepared in Examples 1 to 3 and Comparative Example 3 was left in air at 25° C. and 1 atm for 24 hours.

In Table 1, the generation rate of the oxide film layer is calculated as the thickness of the oxide film layer with respect to the total thickness of the silicon-based coating layer or the Si coating layer including the oxide film layer after the negative electrode active material is left in air.

TABLE 1

| Classification | Generation rate (%) of oxide film layer (thickness of oxide film layer after leaving in air/thickness of coating layer including oxide film layer after leaving in air) |
|---|---|
| Example 1 | 22% |
| Example 2 | 23% |
| Example 3 | 31% |
| Comp. Example 3 | 50% |

Figure 7:
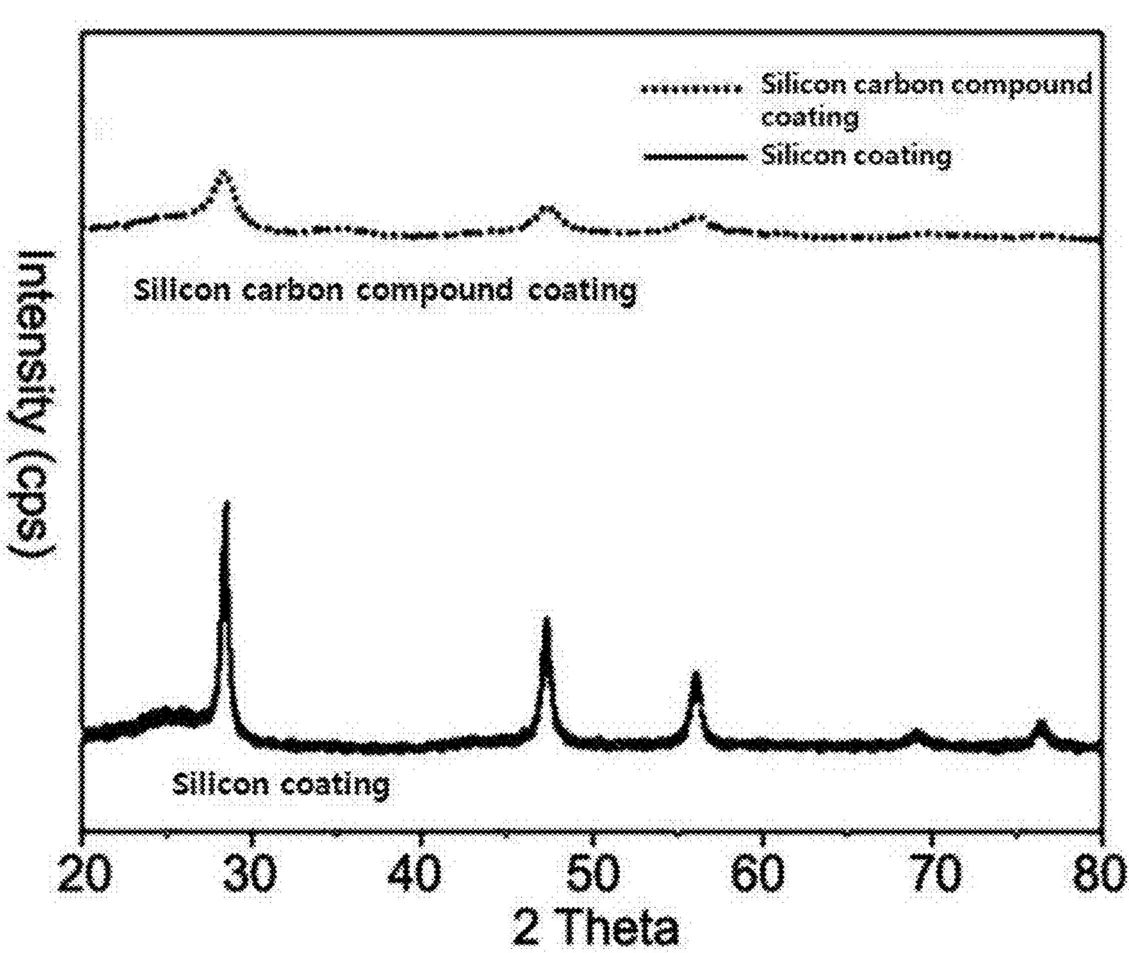
FIG. 7 is graphs illustrating X-ray diffraction pattern data of the silicon carbon compound coating layer of the negative electrode active material prepared in Example 1 and the Si coating layer of the negative electrode active material prepared in Comparative Example 3.

FIG. 7 is an XRD pattern (model name: D/Max2000, manufactured by Rigaku) of the silicon-based coating layer and the Si coating layer of the negative electrode active material prepared in Example 4 and the negative electrode active material prepared in Comparative Example 4.

It could be confirmed that the crystallinity of the silicon-based coating layer of Example 4 was lower than that of Comparative Example 4.

Table 2 summarizes the degree of crystallinity of the silicon-based coating layer or the Si coating layer of Examples 4 to 6 and Comparative Example 4 calculated from Raman spectrum.

A degree of crystallinity was calculated by dividing a peak area of crystalline Si by the sum of a peak area of crystalline Si and a peak area of amorphous Si in the Raman spectrum measured for the surface coating layer of the active material prepared in each of Examples and Comparative Examples.

TABLE 2

| Classification | Degree of crystallinity (%) |
|---|---|
| Example 4 | 20% |
| Example 5 | 25% |
| Example 6 | 23% |
| Comp. Example 4 | 77% |

Figure 8:
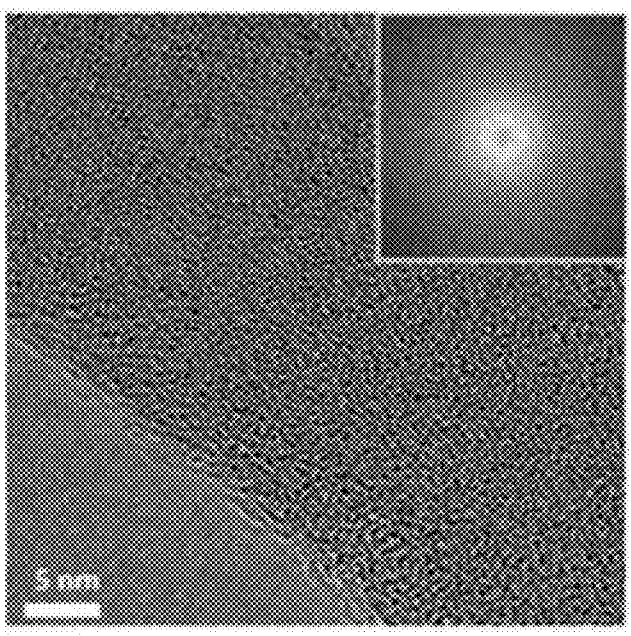
FIG. 8 is a high-resolution transmission electron microscopy (TEM) photograph and a fast Fourier transform (FFT) pattern of the negative electrode active material prepared in Example 1.

FIG. 8 is a transmission electron microscopy (TEM, model name: JEM-2100F, manufactured by FEI) photograph and a fast Fourier transform (FFT) (FFT, model name: Aztec, manufactured by Oxford) pattern of the negative electrode active material prepared in Example 4.

Figure 9:
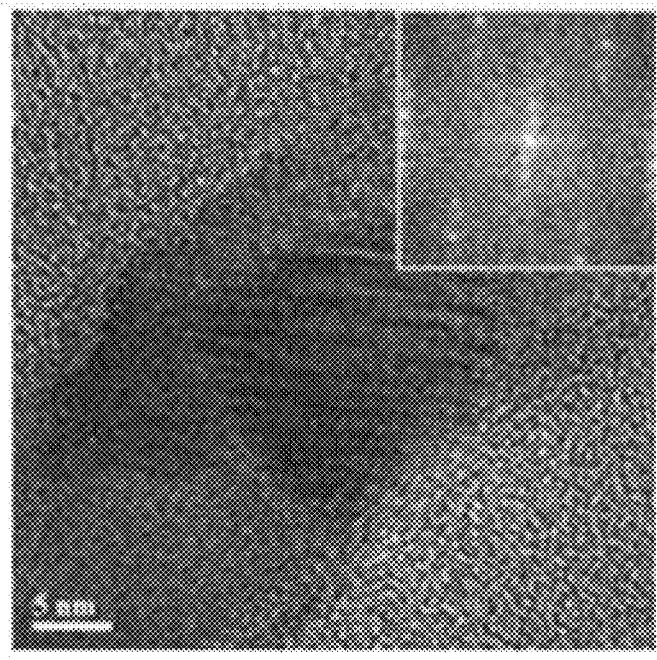
FIG. 9 is a transmission electron microscopy photograph and a fast Fourier transform (FFT) pattern of the negative electrode active material prepared in Comparative Example 3.

FIG. 9 is a TEM (model name: JEM-2100F, manufactured by FEI) photograph and an FFT (model name: Aztec, manufactured by Oxford) pattern of the negative electrode active material prepared in Comparative Example 4.

It could be confirmed that from FIG. 8, the Si particle in the silicon-based coating layer of the negative electrode active material prepared in Example 4 includes crystal grains of 5 nm diameter and from FIG. 9, the Si particle of the Si coating layer of the negative electrode active material prepared in Comparative Example 4 includes coarse crystal grains of 17 nm or more.

Table 3 summarizes an average crystal grains size of the silicon nano-particle distributed in the coating layer of the silicon-based coating layer of Examples 4 to 6 and the coating layer of Comparative Example 4.

TABLE 3

| Classification | Average diameter of crystal grains (nm) |
|---|---|
| Example 4 | 5 nm |
| Example 5 | 5 nm |
| Example 6 | 6 nm |
| Comp. Example 4 | 17 nm |

Examples 7 to 12 and Comparative Examples 5 to 7

Each of the negative electrode active materials prepared in Examples 1 to 6 and Comparative Example 3 was mixed with graphite (negative electrode active material: graphite=40:60 parts by weight), and a negative electrode active material mixed with graphite: conductive material:binder was mixed in distilled water in a weight ratio of 95:1:4 to prepare a slurry (Examples 7 to 12 and Comparative Example 7). The negative electrode active materials prepared in Comparative Examples 1 and 2 were mixed with a negative electrode active material:conductive material: binder at a weight ratio of 95:1:4 in distilled water without mixing with graphite to prepare a slurry (Comparative Example 5 and Comparative Example 6). Here, carbon black (super-P) was used as the conductive material, and sodium carboxymethyl cellulose and styrene butadiene rubber were used in a weight ratio of 1:1 as the binder.

The slurry was uniformly coated on a copper foil, dried at 80° C. in an oven for about 2 hours, then roll-pressed to 50 μm (thickness prior to roll-press=80 μm), and further dried at 110° C. in a vacuum oven for about 12 hours to prepare a negative electrode plate.

A CR2016 coin-type half cell was prepared using the negative plate prepared above, a lithium foil as a counter electrode, a porous polyethylene film as a separator, and a liquid electrolyte in which $LiPF_6$ is dissolved at a concentration of 1.3 M in a solvent in which ethylene carbonate and diethyl carbonate (DEC) are mixed at a volume ratio of 3:7 and fluoro-ethylene carbonate (FEC) is contained in 10 wt %, according to a commonly known preparing process.

Table 4 shows data obtained by evaluating life characteristics of each of the half cells in Examples 7 to 12 and Comparative Examples 5 to 7.

TABLE 4

| Classification | Capacity retention rate (%) after 50 cycles |
|---|---|
| Example 7 | 85.7 |
| Example 8 | 83.0 |
| Example 9 | 81.9 |
| Example 10 | 93.2 |
| Example 11 | 91.0 |
| Example 12 | 88.5 |
| Comp. Example 5 | 72.2 |
| Comp. Example 6 | 78.9 |
| Comp. Example 7 | 75.5 |

From Table 4, it may be appreciated that in Examples 7 to 12, even though charge and discharge of the battery were repeated, a decrease in capacity was small, and improved life characteristics were exhibited.

When comparing Examples 7 to 9 with Comparative Examples 5 and 7, the life characteristics of Examples 7 to 9 were improved as compared to Example 5 including a negative electrode active material in which the silicon-based coating layer of the same amount as the Example is formed on the graphite particles without pores, and Comparative Example 7 wherein only the Si coating layer was formed on the carbon-based particle having pores formed therein. In addition, as a case of forming the outermost carbon layer, even when comparing Examples 10 to 12 and Comparative Example 6, it could be confirmed that the life characteristics were improved in the Examples.

Meanwhile, Examples 7 and 10 in which an average particle diameter of the pores of the carbon-based particle satisfies 200 nm or more and 300 nm or less showed the relatively most excellent life characteristics.

The negative electrode active material for a lithium secondary battery according to an aspect of the present invention may decrease stress applied to the silicon-based coating layer due to volume expansion of the silicon occurring at the time of charging and discharging of the battery by having a small thickness of the silicon-based coating layer and a low crystalline and small crystal grains of the silicon in the silicon-based coating layer while have high capacity characteristics by containing a high silicon content. Therefore, life characteristics of the lithium secondary battery using the negative electrode active material may be improved.

Further, the negative electrode active material for a lithium secondary battery according to an aspect of the present invention suppresses the exposure of silicon to air at the time of pulverizing the negative electrode active material or manufacturing the negative electrode to form an oxide film. Therefore, the capacity and life characteristics of the battery may be improved.

In addition, the negative electrode active material for a lithium secondary battery according to an aspect of the present invention may effectively prevent the electrical isolation phenomenon, the delamination phenomenon, and the like, occurring due to volume expansion of the silicon-based coating layer at the time of charging and discharging the battery. Furthermore, occurrence of the side reaction with the electrolyte and depletion of the electrolyte may be suppressed by blocking a silicon from being directly exposed to the electrolyte. Therefore, excellent life characteristics of the lithium secondary battery using the negative electrode active material may be implemented.

With the method for preparing the negative electrode active material for a lithium secondary battery according to an aspect of the present invention, a large amount of silicon may be deposited on the carbon-based particle at a small thickness, and thus a negative electrode active material having the above-mentioned advantage may be prepared.

The lithium secondary battery according to an aspect of the present invention contains the negative electrode active material for a lithium secondary battery according to an aspect of the present invention, thereby making it possible to exhibit excellent discharge capacity and life characteristics.

Hereinabove, although the present invention has been described by specific matters, the limited embodiments and drawings, they have been provided only for assisting in a more general understanding of the present invention.

Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. A method of preparing a negative electrode active material for a lithium secondary battery, the method comprising:

(a) a step of mixing, stirring, and then firing a first carbon precursor and a ceramic particle for forming pores with each other;

(b) a step of preparing a carbon-based particle including pores in an inner portion and/or a surface thereof by mixing an etching solution of the ceramic particle for forming pores and pulverizing; and (c) a step of forming a silicon-based coating layer containing silicon carbon compound on a pore surface and/or a pore-free surface of the carbon-based particle by chemical vapor deposition (CVD), wherein in step (c), the silicon-based coating layer is formed by chemical vapor deposition (CVD) while simultaneously injecting a silicon precursor gas and a carbon precursor gas under an inert atmosphere, wherein an injection rate of the silicon precursor gas and the carbon precursor gas satisfies a weight ratio of carbon: silicon of 1:5 to 1:15, wherein the silicon-based coating layer includes a silicon carbon compound matrix and Si nano-particles dispersed in the matrix, wherein the Si nano-particles have an average particle diameter of 3 nm to 10 nm.

2. The method of claim 1, wherein the silicon carbon compound satisfies $SiC_x$ ($0<x\leq 2$).

3. The method of claim 1, further comprising, after the step (c), (d) a step of mixing, stirring, and then firing a second carbon precursor with the carbon-based particle.

4. The method of claim 1, wherein the ceramic particle for forming pores has an average particle diameter of 30 nm or more and 900 nm or less.

5. The method of claim 1, wherein in the step (c), the silicon-based coating layer is deposited at a thickness of 5 nm or more and 100 nm or less.

6. The method of claim 3, wherein a firing temperature in the step (a) and/or the step (d) is 600° C. or more and 1500° C. or less.

* * * * *